March 3, 1953  D. C. GERBER ET AL  2,629,949
ELECTRIC FLATIRON

Filed Dec. 8, 1949  2 SHEETS—SHEET 1

INVENTOR.
Dale C. Gerber &
John E. Vance
BY
Harry S. Dumarsh
ATTORNEY.

March 3, 1953

D. C. GERBER ET AL 2,629,949

ELECTRIC FLATIRON

Filed Dec. 8, 1949

INVENTOR.
Dale C. Gerber &
John E. Vance
BY
Harry S. Demarss
ATTORNEY.

Patented Mar. 3, 1953

2,629,949

UNITED STATES PATENT OFFICE 2,629,949

ELECTRIC FLATIRON

Dale C. Gerber and John E. Vance, North Canton, Ohio, assignors to The Hoover Company, North Canton, Ohio, a corporation of Ohio Application December 8, 1949, Serial No. 131,734

6 Claims. (Cl. 38—75)

The present invention relates to electric flat irons and more particularly to improvements in cooling the handle and the temperature control dial.

An object of the invention is to provide an iron wherein the handle and temperature control dial are cooled to a comfortable temperature for the operator's hand. Another object is to provide a handle for an iron which directs cooling air along the handle and temperature control dial. Another object is to provide an iron wherein the handle and the temperature control dial cooperate to distribute a cooling air stream along the dial. Another object is to provide a handle for an iron which directs the flow of cooling air along the temperature control dial. A further object is to provide an iron having a handle which houses a motor driven fan and directs the flow of cooling air along the handle and the temperature control dial. Other objects and advantages of the invention will be apparent from the following description and drawings wherein:

Figure 1:
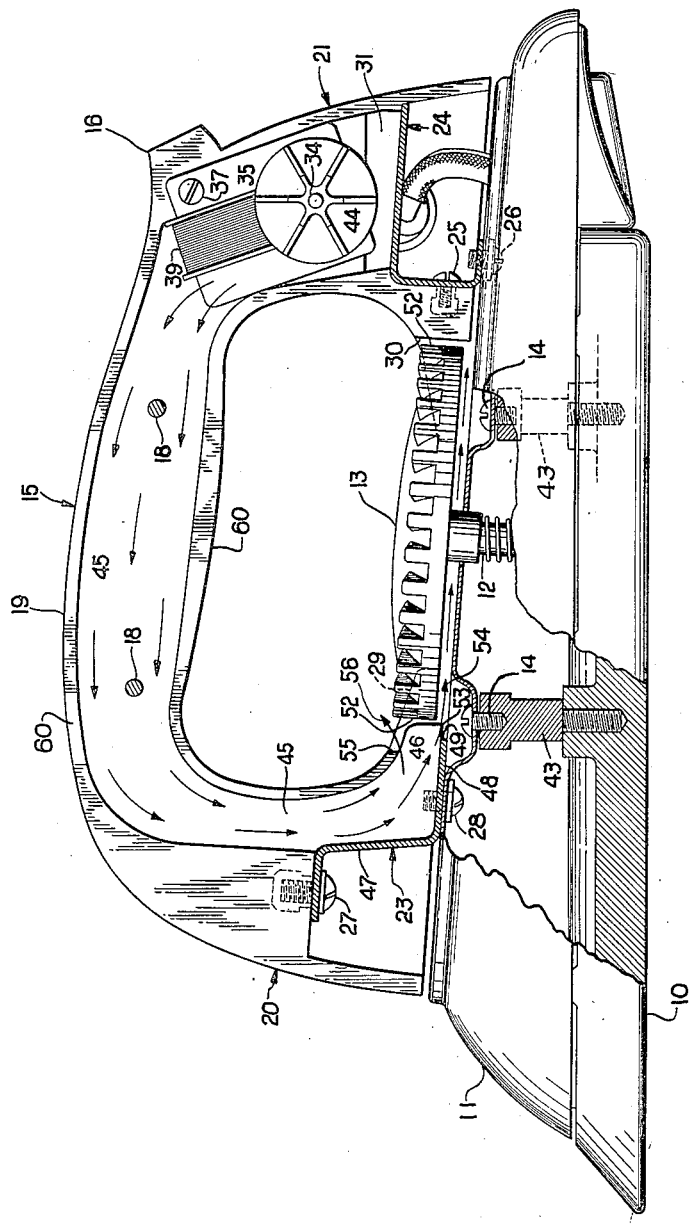
Figure 1 is a side elevation with parts broken away illustrating one embodiment of the invention.
Figure 2:
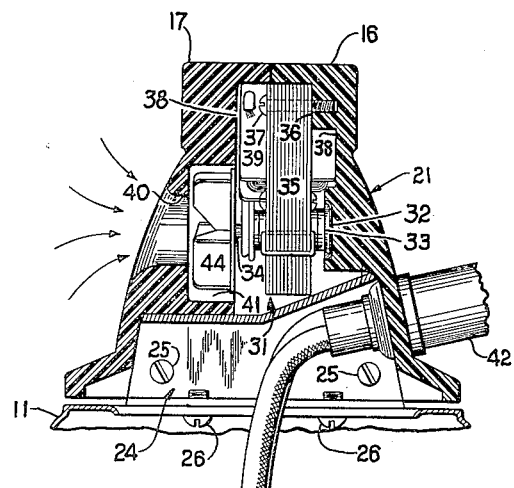
Figure 2 is a sectional view showing the arrangement of the motor and fan in the iron handle.
Figure 3:
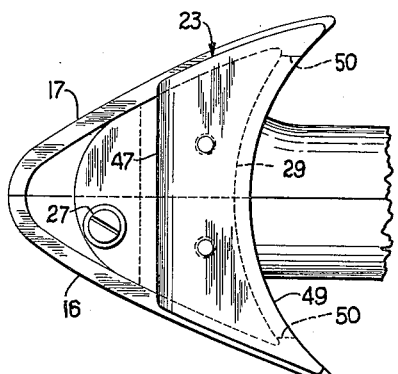
Figure 3 is a view showing the bracket for attaching the front end of the handle to the iron shell.

The embodiment of the invention disclosed in Figures 1 to 3 comprises an iron body including a sole plate 10 and cover shell 11 within which is an unshown heating element and a thermostat device the latter having a shaft 12 extending upwardly through the cover shell 11. Removably attached to the shaft 12 is a dial 13 for operating the thermostat to adjust the ironing temperature. A pair of bolts 14 are threaded into studs 43 in the sole plate 10 to removably attach the cover shell 11, the dial 13 covering the bolts 14.

A handle 15 of suitable insulation material is formed of two cooperating sections 16 and 17 secured together by screws 18—18 to provide a hand grip portion 19 and front and rear supporting legs 20 and 21 respectively. The handle 15 is supported in spaced relation on the cover shell 11 by a front bracket 23 and a rear bracket 24, the latter being secured to the handle rear leg by screws 25 and to the shell 11 by screws 26, while screws 27 and 28 secure the front bracket 23 to the handle front leg 20 and the shell 11. The bases of the supporting legs 20 and 21 are respectively provided with an arcuate edge 29 and 30 to receive the periphery of the dial 13 whereby the latter and the handle bases form a substantially continuous heat barrier above the cover shell 11.

In the handle rear leg 21 is a motor-fan recess 31 formed by the cooperating handle sections 16 and 17. Section 16 is provided with a recess 32 in which is seated a bearing 33 of an armature shaft 34, and a field stack 35 rests against a shoulder 36 and is secured thereto by a bolt 37 threaded into the shoulder 36. The handle section 17 is provided with a fan eye 40 and a fan chamber 41 in which is a fan 44 mounted on the motor shaft 34. Both sections 16 and 17 cooperate to provide opposed walls 38—38 for the field coil 39 supported on the field stack 35.

Prior to assembling the handle sections 16 and 17, the motor bearing 33 is seated in the recess 32 and the bolt 37 threaded into the shoulder 36 thereby supporting the motor and fan in the handle section 16. The handle sections are then secured together by the screws 18 to complete the recess 31 for the motor and also provide the fan chamber 41 and fan eye 40 for the fan 44. The handle rear bracket 24 and the screws 25 also aid in attaching the two handle sections 16 and 17 together. Electric current is supplied to the motor and the heating element by a cord 42 supported in the handle section 16. The motor is connected directly to the cord 42 to operate the fan at all times, and if desired the motor may be connected to the thermostat whereby the latter will control operation of the motor.

An enclosed air passageway 45 is formed by complementary cavities in each handle section 16 and 17, and extends from the motor-fan recess 31 through the hand grip 15 and the handle front supporting leg 20 to an outlet 46 in the arcuate end 29 of the base of the handle leg 20. The lower end of the air passageway 45 is partially closed by the portions 47 and 48 of the handle front supporting bracket 23, and the bracket portion 48 is provided with an arcuate edge 49 which is spaced from the arcuate edge 29 of the handle front supporting leg 20 to define therebetween the outlet 46 for the air passageway 45. The outlet 46 has an arcuate extent indicated between the dotted lines 50—50 in Figure 3. It will be noted that the periphery 52 of the dial 13 is spaced from the arcuate outlet 46 and forms with the arcuate edge 49 of the bracket portion 48 a downwardly directed opening 53 for passage of air between the lower surface of the dial 13 and cover shell 11 is indicated by the arrow 54, and the periphery 52 of the dial 13 cooperates with the arcuate edge 29 of the handle supporting leg 20 to form another opening 55 for flow of air over the top surface of the dial 13 as shown by the arrow 56.

In the use of the improved iron disclosed in Figures 1 to 3, the dial 13 is moved to the desired ironing temperature, and the cord 42 is connected to the source of current to close the circuit to the heating element and the motor, the latter causing the fan 44 to rotate. The fan 44 draws cool air through the fan eye 40 into the recess 31 and discharges the air therefrom over the field stack 35 and field coil 39 to thus cool the motor.

The cooling air continues from the recess 31 through the passageway 45 in the hand grip 19 and the handle supporting leg 20. The peripheral wall 60 of the hand grip 19 is of relatively thin cross section so that the air circulating in the hand grip 19 cools the exterior surface of the latter to cool the operator's hand on the hand grip 19.

At the outlet 46 of the passageway 45 the cooling air is divided by the dial 13 into two air streams indicated by the arrows 54 and 56. The air stream 56 passes through the arcuate constricted outlet 55 over the top surface of the dial 13 to cool the latter to a temperature comfortable to the operator's fingers when adjusting the dial 13. In addition, the air stream 54 passes through the constricted arcuate opening 53 and circulates between the top of the shell 11 and beneath the dial 13 to thereby assist in cooling the latter. Thus the operator's hand is cooled while grasping the hand grip 19, and the dial 13 is maintained cool so there is no danger of burning the operator's fingers when the dial 13 is adjusted.

Figure 4:
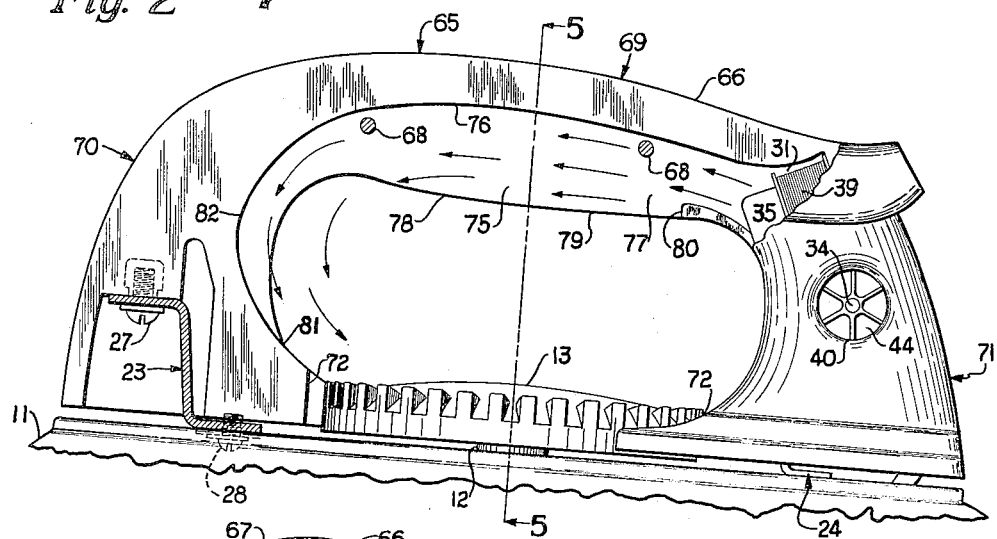
Figure 4 illustrates another embodiment of the invention.
Figure 5:
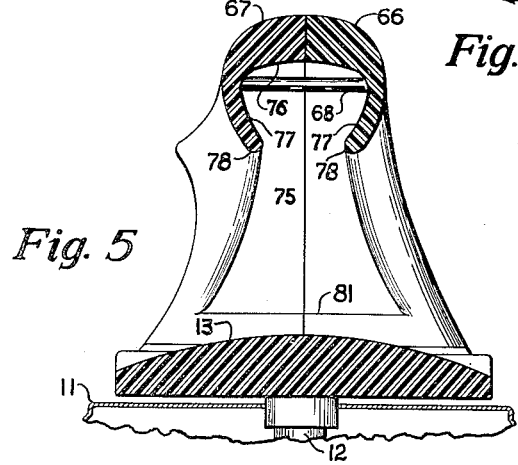
Figure 5 is a section along the line 5—5 of Figure 4.

The embodiment of the invention disclosed in Figures 4 and 5 is similar to that shown in Figures 1 to 3 with the exception of the air passageway in the handle. In the present embodiment the handle 65 is formed in two complementary sections 66 and 67 secured together by screws 68 to provide a recess 31 for the motor and fan, and also forms a hand grip 69 and front and rear supporting legs 70 and 71 respectively. Each base of the handle is provided with a marginal arcuate recess 72 to receive therebetween the dial 13 whereby the latter and the handle bases substantially cover the top of the shell 11.

Each of the handle sections 66 and 67 is provided with a cavity which cooperates to form a substantially U-shaped air passageway 75 defined by an inner wall 76 and opposed side walls 77—77, and the edges 78 of the latter forming a marginal opening 79 for the air passageway 75. The marginal air passageway 75 extends from the end 80 of the motor-fan recess 31 and along the under side of the hand grip 69 and the rear of the handle front support 70 to a point 81 above the dial 13. The inner wall of the air passageway in the front supporting leg 70 is arcuate as indicated at 82 to reduce the depth of the passageway as it approaches the dial 13 and to direct the air stream over the latter. It will be noted that the air passageway 75 becomes wider as it approaches the dial 13 and thus the discharged air is spread over a considerable area of the dial 13.

In the use of this embodiment of the invention the operator's fingers span the mouth 79 of the air passageway 75 in the hand grip 69. The fan 37 forces cool air through the motor recess 31 into the marginal air passageway 75 and as the air circulates therethrough contacts the operator's fingers to cool the latter. The side walls 77—77 of the air passageway in the hand grip 69 are relatively thin and thus the moving air stream cools the outer surface of the hand grip. The air stream is directed downwardly and over the top of the dial 13 by the arcuate contour 82 of the air passageway 75 to thereby cool the dial 13 to a comfortable temperature for the operator's fingers when the dial 13 is adjusted.

We claim:

1. In an electrically heated flat iron comprising: a body, a handle on said body and having a hand grip and front and rear supporting legs, a temperature adjusting dial adjacent said body and disposed between the bases of said supporting legs, means defining a motor-fan recess in one of said supporting legs, means defining an air passageway extending from said motor-fan recess through said hand grip and the other supporting leg and terminating adjacent said dial, a motor and fan mounted in said recess, means defining a port in said one supporting leg communicating with said motor-fan recess for entrance of cooling air to said fan, said fan drawing cooling air through said port and discharging the air into said air passageway, said air passageway guiding the cooling air along said hand grip and said other supporting leg to direct air therefrom along said dial, said motor being arranged in the path of the air discharged from said fan.

2. In an electrically heated flat iron comprising: a body, a handle on said body and having a hand grip and front and rear supporting legs, a temperature adjusting dial adjacent said body and disposed between the bases of said supporting legs, means forming a motor-fan recess in one of said supporting legs, means forming an enclosed air passageway extending from said motor-fan recess through said hand grip and the other supporting leg and having an outlet at the base of said other supporting leg adjacent said body and dial, means spacing said outlet from said body, said dial spaced from said body and cooperating therewith to form a second air path under said dial communicating with said enclosed air passageway outlet, a motor and fan mounted in said recess, means forming a port in said one supporting leg communicating with said motor-fan recess for entrance of cooling air to said fan, said fan drawing cooling air through said port and discharging the air into said enclosed air passageway, said enclosed air passageway guiding the cooling air through said hand grip and said other supporting leg to said outlet, said second air path conveying the cooling air from said outlet to below said dial.

3. In an electrically heated flat iron comprising: a body, a handle on said body and having a hand grip and front and rear supporting legs, a temperature adjusting dial adjacent said body and disposed between the bases of said supporting legs, means forming a motor-fan recess in one of said supporting legs, means forming an enclosed air passageway extending from said motor-fan recess through said hand grip and the other supporting leg, a bracket for attaching said other supporting leg to said body, said bracket cooperating with said other supporting leg to provide an outlet adjacent said dial for said enclosed air passageway to direct the cooling air along said dial, a motor and fan in said recess, means forming a part in said one supporting leg communicating with said motor-fan recess for entrance of cooling air to said fan, said fan drawing cooling air through said port and discharging the air into said enclosed air passageway, said enclosed air passageway guiding the cooling air through said hand grip and said other supporting leg to said outlet for directing the air along said dial.

4. In an electrically heated flat iron comprising: a body, a handle on said body and having a hand grip and front and rear supporting legs, a temperature adjusting dial adjacent said body and disposed between the bases of said supporting legs, means defining a motor-fan recess in one of said supporting legs, means forming a marginal recess extending from said motor-fan recess and formed in said hand grip and the other supporting leg, said marginal recess having its opening exposed toward said dial for movement of cool air along the operator's fingers when grasping said hand grip and over the surrface of said dial, a motor and fan mounted in said motor-fan recess, means forming a port in said one supporting leg communicating with said motor-fan recess for entrance of cooling air to said fan, said fan drawing cooling air through said port and discharging the air into said marginal recess, said marginal recess guiding the cooling air along said hand grip and said other supporting leg to direct the air therefrom over said dial.

5. In an electrically heated flat iron comprising: a body, a handle on said body and having a hand grip and front and rear supporting legs, a temperature adjusting dial adjacent said body and disposed between the bases of said supporting legs, means forming a motor-fan recess in one of said supporting legs, means defining a marginal recess extending from said motor-fan recess and formed in said hand grip and the other supporting leg, directing means in said other supporting leg terminating said marginal recess above said dial for directing cooling air thereover, a motor driven fan in said motor-fan recess, said fan forcing cooling air through said marginal recess and said directing means guiding the cooling air from said marginal recess over the surface of said dial.

6. In an electrically heated flat iron comprising a body, a handle on said body, a temperature adjusting dial, means forming an air passageway in said handle and having an outlet adjacent the periphery of said dial, means supporting said dial completely above and spaced from said body to form with the latter an air space between the bottom surface of said dial and said body and arranging the periphery of said dial at said outlet to direct air therefrom along the top of said dial and through said air space beneath said dial, and means forcing air through said air passageway to cool said handle and through said outlet onto the top surface of said dial and through said air space to cool the lower surface of said dial.

DALE C. GERBER.
JOHN E. VANCE.

REFERENCES CITED

The following references are of record in the file of this patent:

UNITED STATES PATENTS

| Number | Name | Date |
|---|---|---|
| 2,186,930 | Scharf | Jan. 9, 1940 |
| 2,362,590 | Smith | Nov. 14, 1944 |
| 2,362,591 | Smith | Nov. 14, 1944 |
| 2,373,345 | Scharf | Apr. 10, 1945 |

FOREIGN PATENTS

| Number | Country | Date |
|---|---|---|
| 141,742 | Austria | May 10, 1935 |